(12) United States Patent
Neal

(10) Patent No.: US 12,247,684 B2
(45) Date of Patent: Mar. 11, 2025

(54) WIRE MANAGEMENT CLIP

(71) Applicant: Unirac Inc., Albuquerque, NM (US)

(72) Inventor: Jonathan Neal, Albuquerque, NM (US)

(73) Assignee: Unirac, Inc., Albuquerque, NM (US)

( * ) Notice: Subject to any disclaimer, the term of this patent is extended or adjusted under 35 U.S.C. 154(b) by 0 days.

(21) Appl. No.: 18/094,274

(22) Filed: Jan. 6, 2023

(65) Prior Publication Data
US 2023/0213118 A1    Jul. 6, 2023

Related U.S. Application Data

(60) Provisional application No. 63/297,194, filed on Jan. 6, 2022.

(51) Int. Cl.
*F16L 3/01* (2006.01)
*F16L 3/10* (2006.01)

(52) U.S. Cl.
CPC .............. *F16L 3/01* (2013.01); *F16L 3/1058* (2013.01)

(58) Field of Classification Search
CPC ... F16L 3/01; F16L 3/1058; F16L 3/24; F16L 3/12
USPC .................. 248/49, 316.6, 73, 74.1, 74.4
See application file for complete search history.

(56) References Cited

U.S. PATENT DOCUMENTS

| | | | | |
|---|---|---|---|---|
| 3,226,069 A | * | 12/1965 | Clarke | F16L 3/2431 24/282 |
| 3,486,726 A | * | 12/1969 | Kindorf | F16L 3/243 248/228.2 |
| D250,876 S | * | 1/1979 | Lindblom | D8/356 |
| D280,597 S | * | 9/1985 | Fortsch | D8/394 |
| 4,708,554 A | * | 11/1987 | Howard | F16B 37/045 411/84 |
| D331,186 S | * | 11/1992 | Sachs | D8/380 |
| 5,820,083 A | * | 10/1998 | Geiger | F16L 3/137 248/68.1 |
| 7,861,981 B2 | * | 1/2011 | Olver | H02G 3/32 248/65 |
| 9,879,803 B2 | * | 1/2018 | Leng | H02G 3/32 |
| D817,155 S | | 5/2018 | Li | |
| 10,082,224 B2 | * | 9/2018 | Otterström | F16L 3/137 |
| 10,125,898 B2 | * | 11/2018 | Whipple | F16L 3/233 |
| 10,215,310 B2 | * | 2/2019 | Hobson | A61P 31/14 |
| 10,323,774 B2 | * | 6/2019 | Van Hulst | H02G 3/32 |
| D862,206 S | | 10/2019 | Britt | |

(Continued)

OTHER PUBLICATIONS

Invitation to Pay Fees dtd Apr. 3, 2023 for Application PCT/US23/10346, "Wire Management Clip" 2 Pages.

(Continued)

*Primary Examiner* — Muhammad Ijaz
(74) *Attorney, Agent, or Firm* — Lee & Hayes, P.C.

(57) ABSTRACT

A wire management clip for positioning and securing wires, cables, and other components relative to a rail, such as a rail of a modular rail system. The wire management clip includes a body that defines a passage through which a securing device may be inserted to secure the wires, cables, or components to the wire management clip. The wire management clip includes an interface surface against which the wires press when secured by the securing device. The wire management clip also includes a second interface for frictionally interfacing with the rail to resist movement of the wire management clip after installation on the rail.

19 Claims, 4 Drawing Sheets

(56) References Cited

U.S. PATENT DOCUMENTS

| | | | |
|---|---|---|---|
| 10,508,757 B2* | 12/2019 | Vaccaro | F16L 3/133 |
| 10,663,089 B2* | 5/2020 | Sylvester | F16L 3/137 |
| 11,187,353 B1* | 11/2021 | Giuliano | F16B 2/22 |
| 11,463,040 B2* | 10/2022 | Affentranger, Jr. | H02S 30/10 |
| D968,935 S | 11/2022 | Roberts | |
| D980,045 S | 3/2023 | Casey | |
| D983,022 S | 4/2023 | Brown, Jr. | |
| 11,619,324 B2* | 4/2023 | Smith | F16L 3/04 |
| | | | 248/65 |
| D989,607 S | 6/2023 | Fisher | |
| D991,780 S | 7/2023 | Michael | |
| 11,708,918 B1* | 7/2023 | Bell | F16L 3/10 |
| | | | 248/68.1 |
| D1,002,340 S | 10/2023 | Hopkins | |
| 2010/0269447 A1 | 10/2010 | Schuit et al. | |
| 2012/0073219 A1 | 3/2012 | Zuritis | |
| 2013/0011187 A1 | 1/2013 | Schuit et al. | |
| 2014/0097304 A1* | 4/2014 | Mastro | F16L 3/243 |
| | | | 29/428 |
| 2016/0025244 A1* | 1/2016 | Tally | H02G 3/32 |
| | | | 29/428 |
| 2019/0036314 A1* | 1/2019 | Toll | H02G 3/0456 |
| 2020/0031610 A1 | 1/2020 | Britt | |
| 2020/0109800 A1* | 4/2020 | Bell | F16L 3/1058 |
| 2023/0194022 A1* | 6/2023 | Varale | F16L 3/13 |
| | | | 248/69 |
| 2023/0213118 A1* | 7/2023 | Neal | F16L 3/1058 |
| | | | 248/49 |
| 2023/0296192 A1 | 9/2023 | Michael | |

OTHER PUBLICATIONS

Design U.S. Appl. No. 29/823,950, filed Jan. 20, 2022, Neal, et al., "Wire Management Clip."

The PCT Search Report and Written Opinion mailed Jun. 29, 2023 for PCT application No. PCT/US23/10346, 15 pgs.

* cited by examiner

WIRE MANAGEMENT CLIP

RELATED APPLICATIONS

This application claims priority to U.S. Provisional Patent Application No. 63/297,194, filed on Jan. 6, 2022, the entire contents of which are incorporated herein by reference for all purposes.

BACKGROUND

As the solar energy industry continues to grow, the equipment to mount photovoltaic (PV) modules (AKA "solar panels") on different types of structures and/or locations continues to adapt and improve as well. PV systems are generally composed of a number of PV modules set within a metallic frame and a rail system that supports the modules. The rail system is attached to a support structure. The metallic frames of the individual photovoltaic modules, and the structural pieces, e.g., the rails, on which the modules mounted are generally made out of aluminum. As with other sources of electrical power, to ensure the integrity of wires running along the metal frames of the photovoltaic modules, a clip is needed in which the wire can be mounted. Despite numerous existing systems for securing and managing wires and cables, there exists room for improvement.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Systems and devices described herein are related to a wire management clip that may secure to a modular rail system for securing and positioning wires and/or cables or other such components relative to the modular rail system. In some examples, the modular rail system may include an extruded metal rail system, such as shown and described in U.S. Provisional Application No. 63/162,454, filed Mar. 17, 2021, titled "Mounting Systems for Mounting Solar Panel Modules Including Components Thereof," the entirety of which is hereby incorporated by reference. The wire management clip described herein may enable one or more cables, wires, or other components to be positioned and secured relative to the modular rail system. The wire management clip may, for example, be used to secure wires for carrying power from a solar panel to other components of a solar array system. The wire management clip may be positioned by inserting into an open edge of the modular rails system and may be positioned along the length of the modular rail by moving the wire management clip. Friction between the wire management clip and the modular rail may resist movement of the wire management clip once placed on the modular rail. The wire management clip includes a securing device for securing one or more wires or components to the wire management clip and may include, for example, a cable tie, a hook and loop fastener, magnetic fastener, or other such releasable or permanent securing devices. The securing device secures the wires or other components to the wire management clip, which is in turn positioned due to the interface between the modular rail system and the wire management clip.

Figure 1:
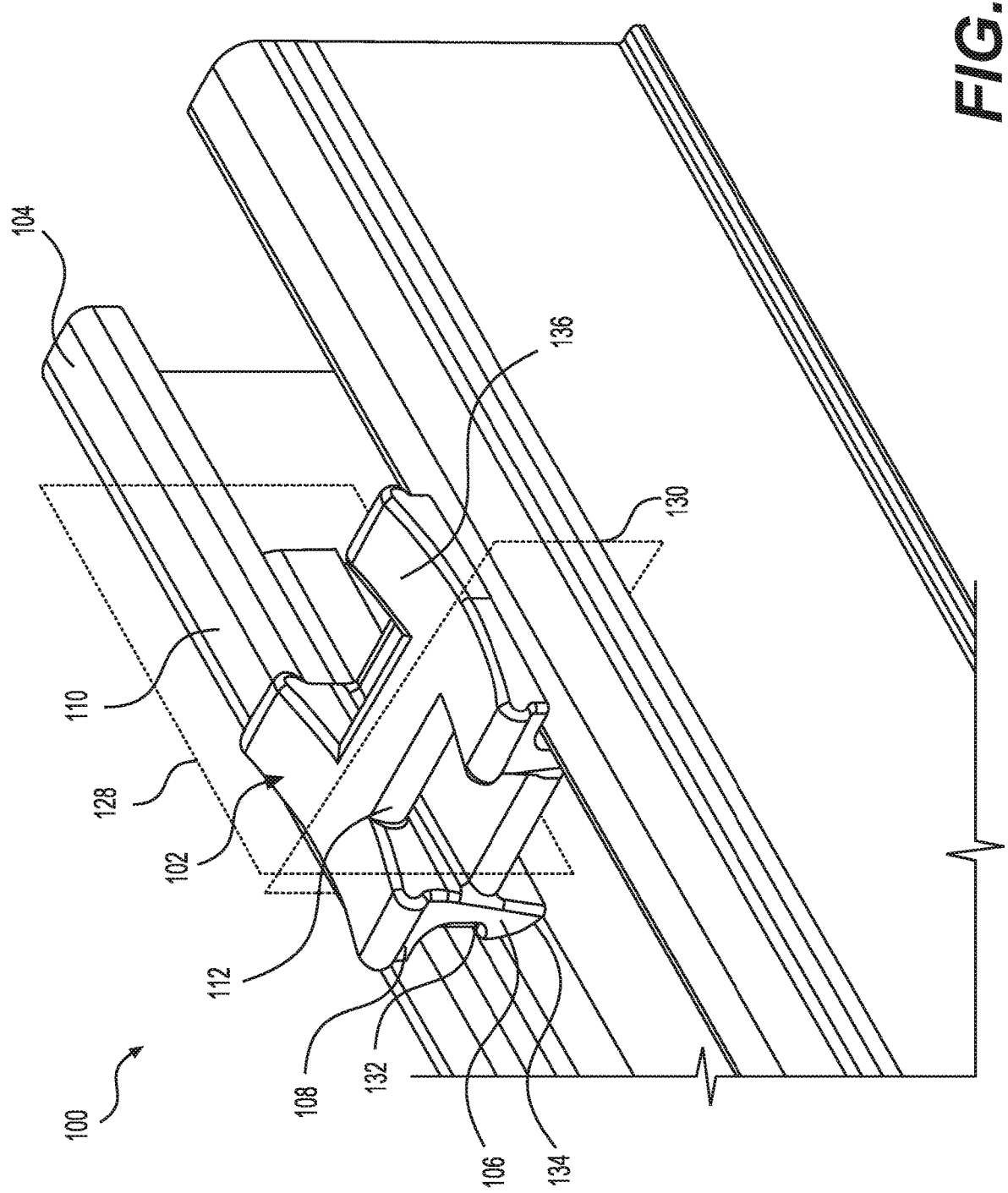
FIG. 1 illustrates an example of a wire management clip installed on a modular rail, according to the instant disclosure.

The figures illustrate wire management clips that may be used as described above to secure and position wires or other components relative to a modular rail system. FIG. 1 illustrates an example of a wire management clip 102 installed on a modular rail 104, according to the instant disclosure. As shown in FIG. 1, the wire management clip 102 is intended to be installed on the modular rail 104 by spanning the width of the channel between the respective vertically extending ends of the two opposing side walls. In an embodiment, the wire management clip 102 may be generally symmetrical, as shown, about a plane 128 that bisects the modular rail 104, where the plane extends into the page of FIG. 1, i.e., along a length of the modular rail 104. In an embodiment, the wire management clip 102 may also be generally symmetrical, as shown, about a second plane 130 that is perpendicular to a length of the modular rail 104. For the sake of conciseness, the following description of elements of the wire management clip 102 refer to features that are associated with one half of the symmetrical shape of the wire management clip 102. That is, the features that are described below, which are focused on the labeled reference numbers on the right side of FIG. 2, for example, including reference numbers 106, 108, 110, may be considered to be equally and mirror-symmetrically found on the left side of the device in FIG. 2, unless otherwise stated.

Figure 2:
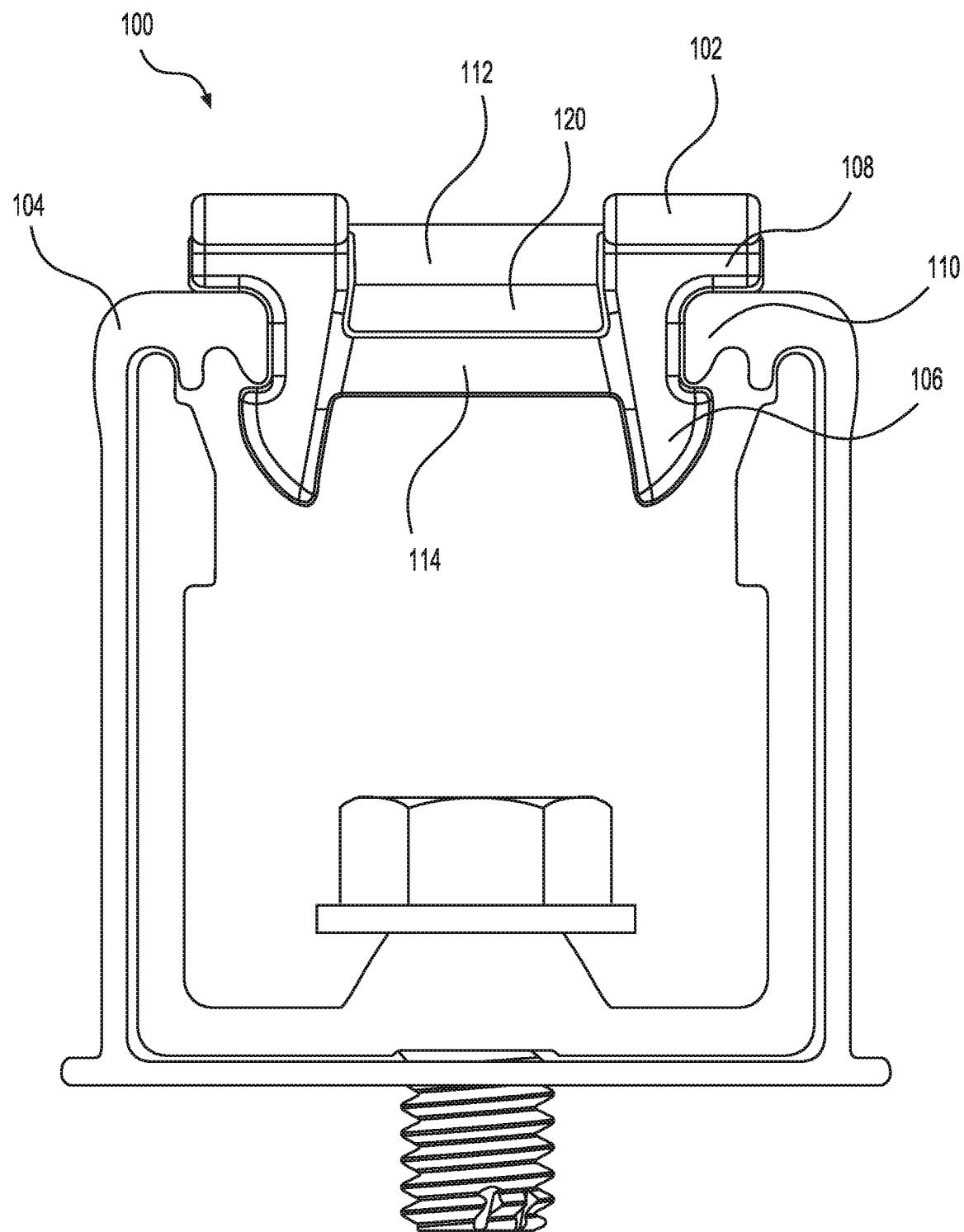
FIG. 2 illustrates an end view of the wire management clip and modular rail of FIG. 1, according to the instant disclosure.

Each side of the wire management clip 102 includes a lower interface portion 106 and an upper interface portion 108 that contact and enclosingly conform to the modular rail 104 at an inside edge 110 of the vertically extending open end of the respective side walls thereof. While the specific shapes of the ends of the side walls of the modular rail 104 and the lower interface portion 106 and the upper interface portion 108 of the wire management clip 102 do not have to be the same, FIG. 2 illustrates an embodiment in which the interfacing shapes thereof conform to each other, which may provide greater security due to the additional surface friction involved therebetween. In this manner, the wire management clip 102 may be secured to and positioned on the modular rail 104 and generally anywhere along the length of the modular rail 104 by sliding the wire management clip 102 along the edge 110. The friction between the lower interface portion 106, the upper interface portion 108, and the edge 110 resists movement of the wire management clip 102 relative to the modular rail 104 after being slid to position. Any modular rail system or opening may be compatible with the wire management clip 102 so long as the upper interface portion 108 and the lower interface portion 106 may engage with an edge of the opening or of a device or system to resist movement of the wire management clip 102.

The lower interface portion 106 and the upper interface portion 108 engage, as shown in the figures, with the edge 110 to resist movement of the wire management clip 102 after installation. A middle interface portion 132, positioned between the lower interface portion 106 and the upper interface portion 108 engages with the edge 110 while the lower interface portion 106 and the upper interface portion extend beyond the edge 110 to partially surround the edge 110 in combination with the middle interface portion 132 and thereby retain the wire management clip 102 in position. During installation, a tapered end 134 of the lower interface portion 106 contacts the edge 110 as the wire management clip 102 is installed and causes the lower interface portion 106 and middle interface portion 132 to flex, enabling the lower interface portion to pass the edge 110 to secure against and underside and/or backside of the edge 110. The lower interface portion 106 includes a bulbous portion and/or a surface that engages with the underside and/or backside of the edge 110 when installed. In this manner, when the wire management clip 102 is installed, after the lower interface portion 106 passes the edge 110, the lower interface portion 106 and/or the middle interface portion 132 returns partially or wholly to the unflexed position, thereby "snapping" into place and securing the wire management clip 102 into the modular rail 104.

The wire management clip 102 includes a securing portion 112 that defines a concave surface 136 against which wires or other devices may rest when secured. The concave surface 136 may be curved around a single axis perpendicular to the direction of the length of the modular rail 104 (such as depicted in FIG. 1). The concave surface 136 may include a continuous or semi-continuous curvature and/or other geometry that forms a concave shape such that wires or other components secured against the wire management clip 102 are at least partially maintained in place by the concave surface 136. In some examples the single axis may be parallel with or at an angle relative to the direction of the length of the modular rail 104. The securing portion 112 may include a securing device such as a cable tie interface, hook and loop fastener, magnetic clasp, or other releasable or non-releasable securing interfaces. In some examples the securing device may be aligned along the direction of the length of the modular rail 104 such that the single axis of the concave surface is perpendicular to the securing device. The securing device may, due to the perpendicular arrangement, securely hold a wire, cable, round element, or other device against the concave surface to secure it in place relative to the modular rail 104.

FIG. 2 illustrates an end view of the wire management clip 102 and modular rail 104 of FIG. 1, according to the instant disclosure. The lower interface portion 106 and upper upper interface portion 108 are shown partially surrounding edge 110 and the resulting friction resists movement of the wire management clip 102. The wire management clip 102 also includes a brace 114 that may serve as a lower surface of the securing portion 112 in some examples, for example to provide a lower surface such that a loose end of a cable tie may be inserted between the securing portion 112 and the brace 114 to secure the securing device around a wire or other component. The brace 114 may also provide an outward force against the edge 110 that results in additional frictional force. For example, the brace 114 may be formed such that the brace 114 causes the width of the wire management clip 102 at the position of the brace 114 is wider than a distance between edges of the opening in the modular rail 104. In this manner, the brace 114 is compressed when the wire management clip 102 is inserted in the opening and provides additional frictional force against the edge 110.

The wire management clip 102 defines a passage 120 through the wire management clip 102 through which a cable tie or other securing device may be inserted. The passage is enclosed by the brace 114 and the securing portion 112 such that a securing device may be inserted through passage 120 to secure a wire to the wire management device. The passage may be sized and configured to receive a plurality of different securing devices including cable ties, twist ties, hook and loop fasteners, magnetic fasteners, and other such securing devices.

In an embodiment, the wire management clip 102 may be installed by sliding the wire management clip into the opening at an end of the modular rail and then sliding to position along the length of the modular rail 104. In some examples the wire management clip 102 may be pushed into the opening, in a direction perpendicular to the direction of the length of the modular rail 104 such that the wire management clip 102 snaps into place due to the width of the lower securing portion being greater than the width of the opening in the modular rail 104. The wire management clip 102 may be formed, at least in part of a plastic material or other flexible material that may allow the lower interface portion 106 to flex when inserted before returning to its original shape or near its original shape after insertion.

Figure 3:
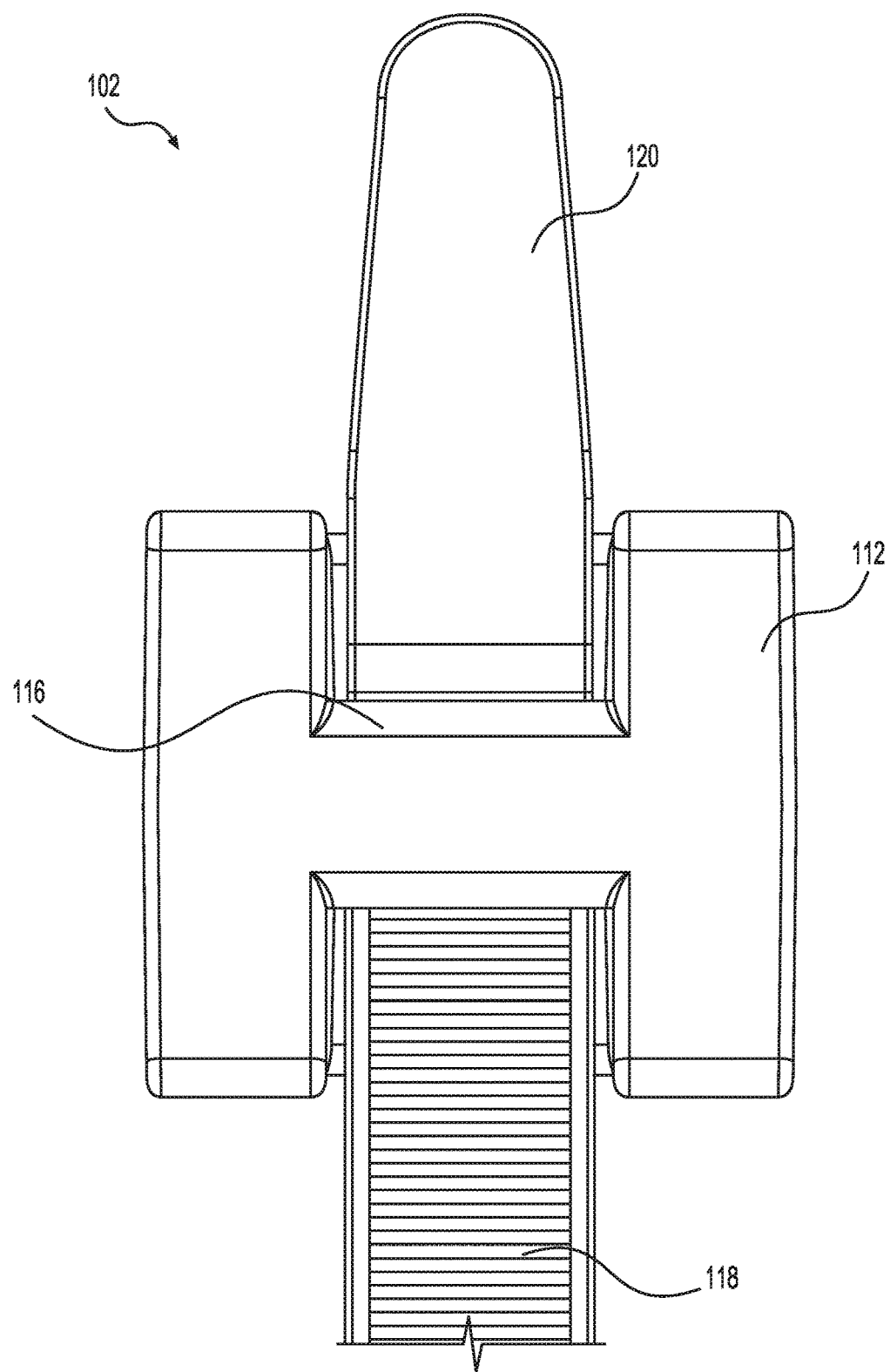
FIG. 3 illustrates an example of a wire management clip, according to the instant disclosure.

FIG. 3 illustrates an example of a wire management clip 102 with a cable tie for a securing device, according to the instant disclosure. Though other securing devices, including those listed above, among other such securing device, may be used in connection with the wire management clip 102, the example shown in FIG. 3 is illustrative of using a cable tie, and it is appreciated that other securing devices will perform in a similar manner though using different securing mechanisms. An end 138 of the cable tie may be inserted through the passage 120 (shown in FIG. 3) and the cable tie may then be secured around the wire or other component, as illustrated in FIG. 4.

In some examples, the wire management clip 102 includes an integral cable tie that is connected at a first end to the wire management clip 102. The cable tie includes a locking surface 118 and an end 138 while the wire management clip 102 includes a locking surface 116 as part of the securing portion 112. The end 138 of the cable tie is inserted into the securing portion 112, for example between an upper surface of the securing portion 112 and the brace 114 or another surface beneath the securing portion 112. The end 138 does not include a locking surface and is used to feed through the locking surface of the securing portion 112 until the locking surface 118 comes in contact with the locking surface 116. The contact between the two locking surfaces enables movement of the end 138 in a single direction (e.g., through the securing portion) but resists or prevents withdrawal of the end 138 or reversing direction of the cable tie. In this manner, the cable tie may be used to securely hold wires in place by tightening the cable tie and relying on the interaction between the locking surfaces to resist or prevent loosening of the cable tie. An end of the cable tie opposite from end 138 may be secured to the wire management clip 102, for example at or beneath the securing portion 112.

Figure 4:
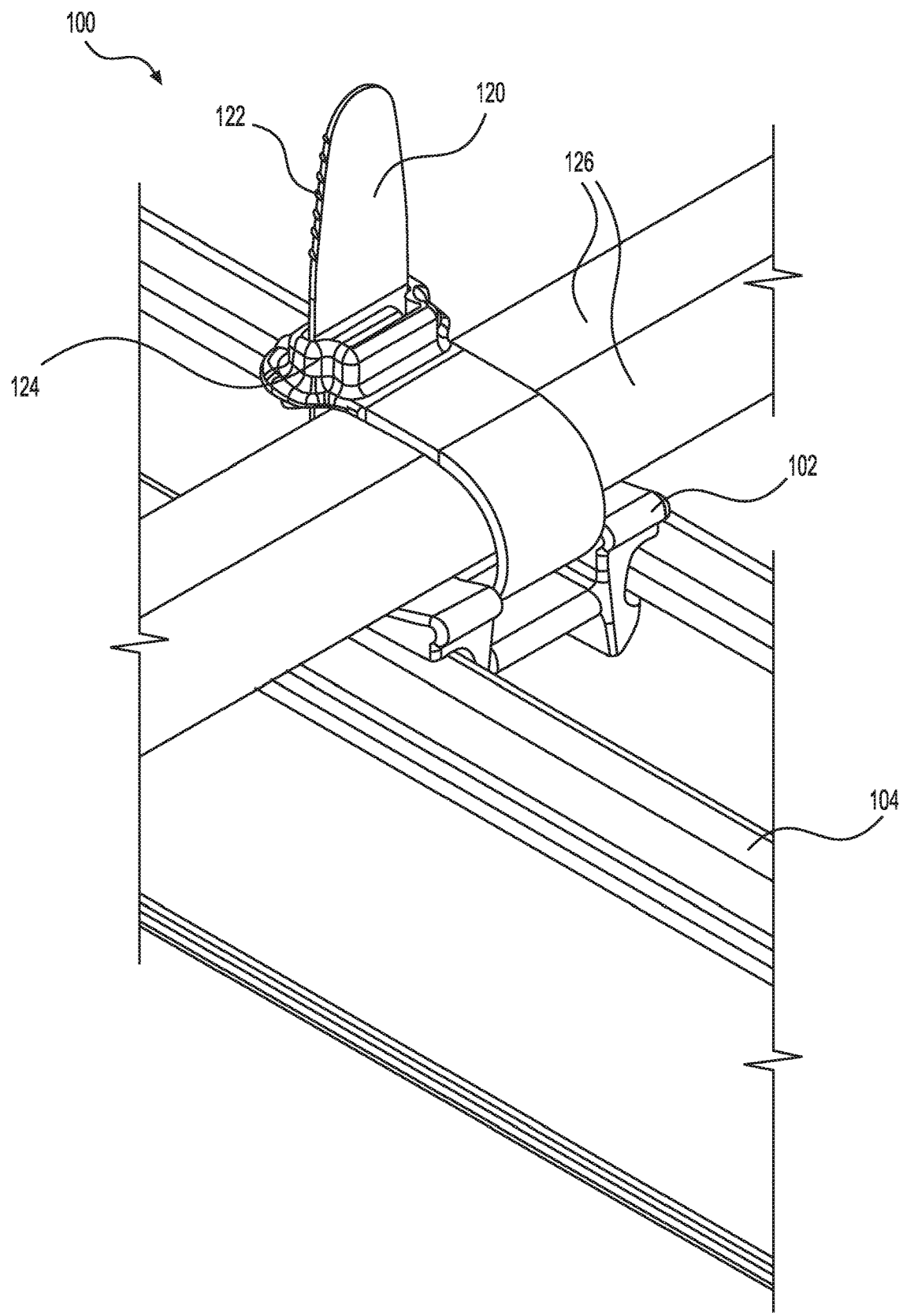
FIG. 4 illustrates an example of a wire management clip installed on a modular rail and securing multiple wires, according to the instant disclosure.

FIG. 4 illustrates an example of a wire management clip 102 installed on a modular rail 104 and including a cable tie 122 for securing multiple wires 126, according to the instant disclosure. The wire management clip 102 is shown installed on the modular rail 104 as shown and described with respect to FIGS. 1-2. A cable tie 122 is inserted through the passage 120 of the wire management clip 102 such that the cable tie is aligned parallel to the length of the modular rail 104. The end 138 of the cable tie 122 is then inserted through a cable tie lock 124 where the locking surfaces of the cable tie 122 interact to allow the end 138 to proceed through the cable tie lock 124 to tighten around the wires 126 while also preventing or resisting loosening of the cable tie 122 once secured.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A wire management clip for positioning components relative to a rail segment, the wire management clip comprising:
    a body defining a passage through the wire management clip configured to receive a securing device, the body comprising:
        a first brace extending along a first direction and having a first width, wherein the first direction corresponds with a width of the rail segment when the wire management clip is installed on the rail segment, wherein the securing device wraps around a middle of the first brace to secure the components;
        a first securing interface extending from the first brace in a second direction, wherein the components contact the first brace and the first securing interface, the first securing interface including:
            a first concave surface at a first end of the first brace having a second width, and
            a second concave surface at a second end of the first brace having a third width, wherein the second width and the third width are greater than the first width;
        a second securing interface extending from the first brace in a third direction parallel with the second direction, the second securing interface including:
            a first arm positioned adjacent the first end of the first brace; and
            a second arm positioned adjacent the second end of the first brace, wherein the first arm and the second arm interface with respective opposing sides of an opening of the rail segment to resist movement of the wire management clip relative to the rail segment; and
        a second brace coupled between the first arm and the second arm at a position between the first brace and distal ends of the first arm and the second arm,
    wherein the first brace and the second brace define at least a portion of a perimeter of the passage; and
    wherein the securing device includes a cable tie having a first locking surface to engage with a second locking surface positioned on the body within the passage.

2. The wire management clip of claim 1, wherein:
    the first arm includes a first angled portion that extends in a fourth direction different from the third direction, and the first arm further includes a first middle portion configured to rest against a first internal surface of a channel defined by the rail segment; and
    the second arm includes a second angled portion that extends in a fifth direction opposite the fourth direction, and the second arm further includes a second middle portion configured to rest against a second internal surface of the channel, the second internal surface opposite the first internal surface.

3. The wire management clip of claim 2, wherein the first arm has a first width adjacent the first brace, a second width at the first angled portion adjacent a distal end of the first arm, and a third width at the first middle portion, the third width less than the first width and the second width.

4. The wire management clip of claim 2, wherein the second brace connects the first arm at a first position along a first length of the first arm to the second arm at a second position along a second length of the second arm and the second brace is parallel with the first brace.

5. The wire management clip of claim 1, wherein the body comprises a plastic material as a unibody configuration.

6. A wire management clip, comprising:
    a body defining a passage configured for securing one or more components to a rail segment, the body comprising:
        a horizontal brace extending along a first direction;
        a first securing interface extending from the horizontal brace in a second direction perpendicular to the rail segment, wherein the first securing interface includes:
            a first curved member extending along the second direction at a first end of the horizontal brace; and
            a second curved member extending along the second direction at a second end of the horizontal brace; and
        a second securing interface extending from the horizontal brace in a third direction parallel with the second direction, the second securing interface configured to frictionally interface with respective opposite sides of a channel defined by the rail segment and resist movement of the wire management clip relative to the rail segment,
    wherein the second securing interface comprises:
        a first arm positioned adjacent the first end of the horizontal brace; and
        a second arm positioned adjacent the second end of the horizontal brace; and
    a cable tie having a first locking surface to engage with a second locking surface positioned on the body within the passage.

7. The wire management clip of claim 6, wherein:
    the first arm comprises a first protrusion positioned adjacent a first distal end of the first arm that extends in a fourth direction, wherein the first arm further includes a first middle portion configured to rest against a first internal surface of the channel; and
    the second arm comprises a second protrusion positioned adjacent a second distal end of the second arm that extends in a fifth direction opposite the fourth direction, wherein the second arm further includes a second middle portion configured to rest against a second internal surface of the channel, the second internal surface opposite the first internal surface.

8. The wire management clip of claim 7, wherein the horizontal brace is a first horizontal brace, the wire management clip further comprising a second horizontal brace connecting the first arm and the second arm and defining at least a portion of a perimeter of the passage through the body, the second horizontal brace coupled to the first arm at a first position along a first length of the first arm and coupled to the second arm at a second position along a second length of the second arm.

9. The wire management clip of claim 7, wherein the first arm has a first width at a first end adjacent the body, a second width adjacent the first distal end, and a third width at the first middle portion, the third width less than the first width and the second width.

10. The wire management clip of claim 8, further comprising a hook and loop fastener that passes through the passage.

11. The wire management clip of claim 8, further comprising a cable tie that passes through the passage.

12. The wire management clip of claim 11, wherein the perimeter of the passage comprises a first locking surface configured to interface with a second locking surface of the cable tie to retain the cable tie in a securing position.

13. The wire management clip of claim 6, wherein the wire management clip is formed of a plastic material as a unibody configuration.

14. A system comprising:
a support structure to support one or more components of an electrical system, the support structure comprising:
a rail defining a channel; and
a wire management clip comprising:
a first brace extending along a first direction corresponding with a width of the channel or rail;
a first securing interface extending from the first brace in a second direction away from the rail, the first securing interface comprising:
a first curved member extending along the second direction from a first end of the first brace, and
a second curved member and extending along the second direction from a second end of the first brace; and
a second securing interface extending from the first brace in a third direction opposite the second direction, the second securing interface configured to frictionally interface with the channel and comprising:

a first arm positioned adjacent the first end of the first brace; and
a second arm positioned adjacent the second end of the first brace,
wherein the first arm and the second arm frictionally interface with respective opposing sides of the channel to resist movement of the wire management clip relative to the rail.

15. The system of claim 14, wherein:

the first arm includes a first protrusion positioned adjacent a first distal end that extends in a fourth direction and the first arm further comprises a first middle portion configured to rest against a first internal surface of the channel; and the second arm includes a second protrusion positioned adjacent a second distal end that extends in a fifth direction opposite the fourth direction and the second arm further comprises a second middle portion configured to rest against a second internal surface of the channel, the second internal surface opposite the first internal surface.

16. The system of claim 15, further comprising a second brace connecting the first arm and the second arm and defining, with the first brace, at least a portion of a perimeter of a passage perpendicular to the first direction through the wire management clip, the second brace coupled to the first arm at the first middle portion and coupled to the second arm at the second middle portion.

17. The system of claim 14, wherein the wire management clip comprises a securing device configured to releasably secure the one or more components.

18. The system of claim 14, wherein the wire management clip comprises a cable tie extending from the first brace.

19. The system of claim 18, wherein a passage defined at least in part by the first brace comprises a locking surface configured to interface with the cable tie to retain the cable tie in a securing position.

* * * * *